(12) United States Patent
Evans

(10) Patent No.: US 8,057,171 B2
(45) Date of Patent: Nov. 15, 2011

(54) FAN ASSEMBLY

(75) Inventor: Dale E. Evans, Derby (GB)

(73) Assignee: Rolls-Royce, PLC., London (GB)

( * ) Notice: Subject to any disclaimer, the term of this patent is extended or adjusted under 35 U.S.C. 154(b) by 508 days.

(21) Appl. No.: 12/379,228

(22) Filed: Feb. 17, 2009

(65) Prior Publication Data
US 2009/0269197 A1 Oct. 29, 2009

(30) Foreign Application Priority Data

Apr. 28, 2008 (GB) .................................. 0807601.0

(51) Int. Cl.
*F01D 25/24* (2006.01)
(52) U.S. Cl. .......................... 415/214.1; 415/9; 415/220
(58) Field of Classification Search ........... 415/9, 214.1, 415/220, 215.1
See application file for complete search history.

(56) References Cited

U.S. PATENT DOCUMENTS

| | | | | |
|---|---|---|---|---|
| 3,602,602 A * | 8/1971 | Motta | ................. | 415/9 |
| 3,762,833 A | 10/1973 | Miller et al. | | |
| 3,974,313 A * | 8/1976 | James | ................. | 428/176 |
| 4,149,824 A * | 4/1979 | Adamson | ................. | 415/9 |
| 4,377,370 A * | 3/1983 | Porcelli | ................. | 415/9 |
| 4,411,589 A * | 10/1983 | Joubert et al. | ................. | 415/9 |
| 4,425,080 A * | 1/1984 | Stanton et al. | ................. | 415/197 |
| 4,452,565 A * | 6/1984 | Monhardt et al. | ................. | 415/9 |
| 4,490,092 A * | 12/1984 | Premont | ................. | 415/1 |
| 4,534,698 A * | 8/1985 | Tomich | ................. | 415/9 |
| 4,547,122 A * | 10/1985 | Leech | ................. | 415/9 |
| 4,648,795 A * | 3/1987 | Lardellier | ................. | 415/196 |
| 4,699,567 A * | 10/1987 | Stewart | ................. | 415/200 |
| 4,718,818 A * | 1/1988 | Premont | ................. | 415/9 |
| 4,818,176 A * | 4/1989 | Huether et al. | ................. | 415/9 |
| 4,902,201 A * | 2/1990 | Neubert | ................. | 415/197 |
| 5,188,505 A * | 2/1993 | Schilling et al. | ................. | 415/9 |
| 5,259,724 A * | 11/1993 | Liston et al. | ................. | 415/9 |
| 5,328,324 A * | 7/1994 | Dodd | ................. | 415/9 |
| 5,336,044 A * | 8/1994 | Forrester | ................. | 415/9 |
| 5,344,280 A * | 9/1994 | Langenbrunner et al. | ................. | 415/9 |
| 5,403,148 A * | 4/1995 | Forrester | ................. | 415/9 |
| 5,408,826 A * | 4/1995 | Stewart et al. | ................. | 60/226.1 |
| 5,409,349 A * | 4/1995 | Kulak et al. | ................. | 415/9 |

(Continued)

FOREIGN PATENT DOCUMENTS
FR 2 888 621 A1 1/2007

*Primary Examiner* — Ross Gushi
(74) *Attorney, Agent, or Firm* — Oliff & Berridge, PLC

(57) ABSTRACT

A fan assembly for a gas turbine, the assembly comprising: a fan surrounded by a fan casing; a resilient, radially flexible containment material wrapped around the outside of the fan casing for containing a fan blade which has breached the casing during a fan blade-off event, and a retaining cable arrangement for resisting separation of a first portion of the casing from a second portion of the casing as a result of said breach occurring between the first and second portion; wherein the cable arrangement comprises: a retaining cable on the outside of the containment material, secured between the first and second portion of the casing, the retaining cable being sufficiently radially compliant for radial deflection to accommodate radial flexing of the containment material caused by impact of said fan blade in between the first and second portion; and a locking arrangement operable to subsequently lock the retaining cable between the front and rear portions of the casing whereby separation of the front and rear portions is resisted by tension in the locked cable.

12 Claims, 3 Drawing Sheets

U.S. PATENT DOCUMENTS

| Patent No. | | Date | Inventor | Class |
|---|---|---|---|---|
| 5,431,532 | A * | 7/1995 | Humke et al. | 415/9 |
| 5,437,538 | A * | 8/1995 | Mitchell | 415/9 |
| 5,447,411 | A * | 9/1995 | Curley et al. | 415/9 |
| 5,482,429 | A * | 1/1996 | Penda | 415/9 |
| 5,486,086 | A * | 1/1996 | Bellia et al. | 415/9 |
| 5,513,949 | A * | 5/1996 | Armstrong | 415/9 |
| 5,516,257 | A * | 5/1996 | Kasprow et al. | 415/9 |
| 5,516,258 | A * | 5/1996 | Newton | 415/9 |
| 5,622,472 | A * | 4/1997 | Glowacki | 415/9 |
| 5,823,739 | A * | 10/1998 | Van Duyn | 415/9 |
| 5,885,056 | A * | 3/1999 | Goodwin | 415/9 |
| 6,053,696 | A * | 4/2000 | Roberts | 415/9 |
| 6,059,523 | A * | 5/2000 | Modafferi et al. | 415/9 |
| 6,059,524 | A * | 5/2000 | Costa et al. | 415/9 |
| 6,113,347 | A * | 9/2000 | Forrester | 415/9 |
| 6,120,242 | A * | 9/2000 | Bonnoitt et al. | 415/9 |
| 6,173,566 | B1 | 1/2001 | Boeck | |
| 6,179,551 | B1 * | 1/2001 | Sathianathan et al. | 415/9 |
| 6,206,631 | B1 * | 3/2001 | Schilling | 415/9 |
| 6,371,721 | B1 * | 4/2002 | Sathianathan et al. | 415/9 |
| 6,394,746 | B1 * | 5/2002 | Sathianathan et al. | 415/9 |
| 6,468,026 | B1 * | 10/2002 | Bonnoitt et al. | 415/9 |
| 6,497,550 | B2 | 12/2002 | Booth | |
| 6,543,991 | B2 * | 4/2003 | Sathianathan et al. | 415/9 |
| 6,575,694 | B1 * | 6/2003 | Thompson et al. | 415/9 |
| 6,638,008 | B2 * | 10/2003 | Sathianathan et al. | 415/9 |
| 6,652,222 | B1 * | 11/2003 | Wojtyczka et al. | 415/9 |
| 6,739,830 | B2 * | 5/2004 | Sathianathan et al. | 415/9 |
| 6,769,864 | B2 * | 8/2004 | Sathianathan et al. | 415/9 |
| 6,814,541 | B2 * | 11/2004 | Evans et al. | 415/200 |
| 6,829,883 | B2 * | 12/2004 | Sathianathan et al. | 60/226.1 |
| 6,913,436 | B2 * | 7/2005 | McMillan et al. | 415/9 |
| 6,979,172 | B1 * | 12/2005 | Mackenzie | 415/9 |
| 7,018,168 | B2 * | 3/2006 | Worthoff et al. | 415/9 |
| 7,076,942 | B2 * | 7/2006 | Schreiber | 60/223 |
| 7,192,243 | B2 * | 3/2007 | Lawson et al. | 415/9 |
| 7,246,990 | B2 * | 7/2007 | Xie et al. | 415/9 |
| 7,390,161 | B2 * | 6/2008 | Xie et al. | 415/9 |
| 7,402,022 | B2 * | 7/2008 | Harper et al. | 415/9 |
| 7,445,421 | B2 * | 11/2008 | Sathianathan | 415/9 |
| 7,503,164 | B2 * | 3/2009 | McMillan | 60/226.1 |
| 7,513,734 | B2 * | 4/2009 | McMillan | 415/9 |
| 7,517,184 | B2 * | 4/2009 | Costa et al. | 415/1 |
| 7,524,161 | B2 * | 4/2009 | Lawson et al. | 415/9 |
| 7,604,199 | B2 * | 10/2009 | McMillan et al. | 244/53 R |
| 7,713,021 | B2 * | 5/2010 | Finn et al. | 415/9 |
| 7,766,603 | B2 * | 8/2010 | Beckford et al. | 415/9 |
| 7,780,401 | B2 * | 8/2010 | Lenk et al. | 415/9 |
| 7,806,364 | B1 * | 10/2010 | Udall | 244/54 |
| 7,866,939 | B2 * | 1/2011 | Harper et al. | 415/9 |
| 7,914,251 | B2 * | 3/2011 | Pool et al. | 415/9 |
| 7,959,405 | B2 * | 6/2011 | Launders | 415/9 |
| 2001/0028840 | A1 * | 10/2001 | Booth | 415/9 |
| 2002/0004005 | A1 * | 1/2002 | Sathianathan et al. | 415/173.1 |
| 2002/0141859 | A1 * | 10/2002 | Sathianathan et al. | 415/9 |
| 2002/0164244 | A1 * | 11/2002 | Sathianathan et al. | 415/9 |
| 2003/0138316 | A1 * | 7/2003 | Sathianathan et al. | 415/9 |
| 2004/0141837 | A1 * | 7/2004 | McMillan et al. | 415/173.3 |
| 2004/0146393 | A1 * | 7/2004 | Evans et al. | 415/9 |
| 2005/0074328 | A1 * | 4/2005 | Martindale et al. | 415/173.1 |
| 2005/0089391 | A1 * | 4/2005 | Stretton | 415/9 |
| 2005/0238484 | A1 * | 10/2005 | Lawson et al. | 415/173.1 |
| 2005/0271503 | A1 * | 12/2005 | Harper et al. | 415/170.1 |
| 2006/0034682 | A1 * | 2/2006 | McMillan | 415/173.4 |
| 2006/0059889 | A1 * | 3/2006 | Cardarella, Jr. | 60/226.1 |
| 2006/0165519 | A1 * | 7/2006 | McMillan et al. | 415/173.1 |
| 2006/0210391 | A1 * | 9/2006 | McMillan | 415/121.2 |
| 2006/0269402 | A1 * | 11/2006 | Beckford et al. | 415/173.1 |
| 2006/0292002 | A1 * | 12/2006 | Sathianathan | 415/173.3 |
| 2007/0031246 | A1 * | 2/2007 | Peng | 415/173.1 |
| 2007/0081887 | A1 * | 4/2007 | Xie et al. | 415/9 |
| 2007/0110557 | A1 * | 5/2007 | Lawson et al. | 415/9 |
| 2008/0128073 | A1 * | 6/2008 | Xie et al. | 156/172 |
| 2008/0145215 | A1 * | 6/2008 | Finn et al. | 415/200 |
| 2008/0199301 | A1 * | 8/2008 | Cardarella, Jr. | 415/9 |
| 2008/0232951 | A1 * | 9/2008 | Cardarella | 415/9 |
| 2008/0253883 | A1 * | 10/2008 | Pool et al. | 415/200 |
| 2009/0067979 | A1 * | 3/2009 | Braley et al. | 415/9 |
| 2009/0087309 | A1 * | 4/2009 | Schreiber | 415/200 |
| 2009/0110538 | A1 * | 4/2009 | Kostka et al. | 415/9 |
| 2009/0175714 | A1 * | 7/2009 | Cacace | 415/9 |
| 2009/0269197 | A1 * | 10/2009 | Evans | 415/214.1 |
| 2009/0324390 | A1 * | 12/2009 | Harper et al. | 415/119 |
| 2010/0077721 | A1 * | 4/2010 | Marshall | 60/39.091 |
| 2010/0189552 | A1 * | 7/2010 | Evans | 415/182.1 |
| 2010/0266384 | A1 * | 10/2010 | Evans et al. | 415/9 |
| 2010/0284790 | A1 * | 11/2010 | Pool et al. | 415/119 |
| 2011/0020106 | A1 * | 1/2011 | Launders | 415/1 |
| 2011/0033286 | A1 * | 2/2011 | Vauchel | 415/182.1 |
| 2011/0052382 | A1 * | 3/2011 | Cheung | 415/200 |
| 2011/0052383 | A1 * | 3/2011 | Lussier | 415/200 |
| 2011/0076132 | A1 * | 3/2011 | Bottome | 415/9 |
| 2011/0081227 | A1 * | 4/2011 | McMillan | 415/9 |
| 2011/0179805 | A1 * | 7/2011 | Chatelois et al. | 60/796 |

* cited by examiner

FAN ASSEMBLY

The present invention relates to a fan assembly for a gas turbine.

Fan casings in gas turbines generally need to be designed to withstand the impact of a detached fan blade during a so-called "fan blade-off" (FBO) event, during which the detached fan blade is typically thrown against the fan casing at very high tangential velocity.

Generally speaking, there are two types of fan casing designs for mitigating the effects of FBO events: so-called "hard wall" casings and "soft wall" casings.

Hard wall fan casings rely on sufficiently high strength metallic casings, such as ribbed Armcor or Titanium casings, to contain the thrown blade(s) without catastrophic failure and to maintain the structural integrity of the casing following the fan blade impact. However, these designs inevitably carry an associated weight penalty and this is particularly a problem in aerospace applications, where the weight of the fan casing may account for as much as 5 to 10% of the total engine weight.

In soft wall fan casings, the weight is reduced significantly by using a relatively low strength fan casing, typically formed from aluminium, which is then wrapped with ballistic Kevlar®. During a fan blade impact, the fan blade breaches the aluminium, but is contained by the Kevlar® wrap, which 'catches' the blade and radially flexes to dissipate the associated impact energy in a "circumferential wave" travelling around the Kevlar wrap®. However, although the use of a Kevlar® wrap in soft wall casings adequately compensates for the associated lightweight casing in terms of containing the fan blade at impact, the Kevlar® wrap is less effective at providing subsequent axial structural support for the casing in order to maintain the integrity of the casing post-impact. Again, maintaining structural integrity of the casing following blade impact may be particularly critical in aerospace applications.

It is an object of the present invention to seek to provide an improved fan assembly for a gas turbine, in particular but not exclusively for an aircraft engine.

According to the present invention, there is provided a fan assembly for a gas turbine, the assembly comprising: a fan surrounded by a fan casing; a resilient, radially flexible containment material wrapped around the outside of the fan casing for containing a fan blade which has breached the casing during a fan blade-off event, and a retaining cable arrangement for resisting separation of a first portion of the casing from a second portion of the casing as a result of said breach occurring between the first and second portion; wherein the cable arrangement comprises: a retaining cable on the outside of the containment material, secured between the first and second portion of the casing, the retaining cable being sufficiently radially compliant for radial deflection to accommodate radial flexing of the containment material caused by impact of said fan blade in between the first and second portion; and a locking arrangement operable to subsequently lock the retaining cable between the front and rear portions of the casing whereby separation of the front and rear portions is resisted by tension in the locked cable.

In one embodiment, the cable is mounted to anchorages fixed relative to the first and second portions, the cable being spring-loaded between the anchorages for resilient radial deflection, against the action of the spring-load, to accommodate said radial flexing of the containment material. The spring-loading may be provided by one or more biasing members each acting between the cable and a respective one of the fixed anchorages. In a particular embodiment, the cable is fixed to one anchorage and said one or more biasing members act between the cable and the other of said anchorages.

The biasing member may be a spring or an elastomeric element.

A fan assembly according to any preceding claim, wherein the locking arrangement comprises one or more locking elements associated with the first or second casing portion, each locking element being biased for movement from a primed position into locking engagement with the cable, each locking element further being held in said primed position by a retaining element coupled to the cable for releasing the locking element in response to said radial deflection of the cable.

In one embodiment, the locking element is a catch resiliently mounted to one of the anchorages, the retaining element is an interposing tab positioned between the catch and the cable for preventing engagement of the catch with the cable, and the tab is frangibly attached to one of the catch or cable for detachment therefrom upon said resilient radial deflection of the cable.

In another embodiment, the cable is spring loaded between the anchorages for resilient radial deflection and further incorporates a stop element, the catch being radially biased for locking engagement with a detent on the stop element as the cable returns to said spring loaded position following said radial deflection, the catch being spaced away from the detent by the interposing frangible tab. The stop element may incorporate a ramp surface, adjacent the detent, for allowing progressive sliding longitudinal movement of the catch over the stop element, against said radial catch bias, until such time as the catch is radially aligned with the detent.

The fan assembly may form part of a gas turbine, in particular the fan assembly may form part of an aircraft engine.

Embodiments of the invention will now be described in more detail, by way of example, with reference to the accompanying drawings, in which:

FIG. 1 shows a fan assembly 1 for a gas turbine, in this case an aircraft engine.

Figure 1:
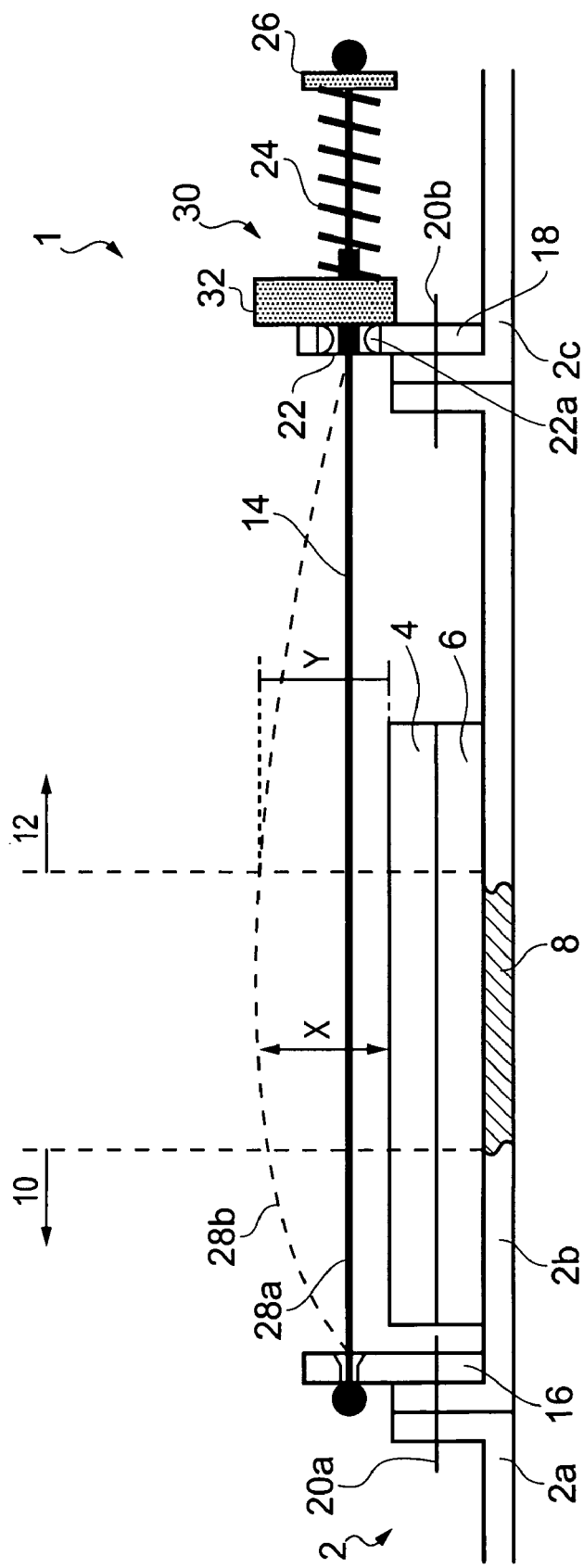
FIG. 1 is a schematic cross-sectional side view through part of a fan assembly.

The fan assembly 1 comprises a "soft wall" cylindrical fan casing 2 (only the upper section of which is explicitly shown in FIG. 1) comprising three casing sections: a frontal "intake" section 2a, a mid-section 2b that surrounds the blades of a respective bypass fan (not shown) and a rear section 2c. The casing 2 may be formed from any suitable "soft wall" casing material such as aluminium.

A radially flexible containment material 4, such as sheet Kevlar®, is wrapped around the outside of the mid-section 2b of the casing 2 i.e. surrounding the blades of the bypass fan, supported on composite support rails 6 (only one of which is shown in FIG. 1).

During an FBO event a fan blade will typically breach or "trepan" the casing 2, specifically the mid section 2b adjacent the rotating fan blades. The fan blade will then impact the containment material 4 at high velocity, and the containment material will radially flex to dissipate the energy of the impact before eventually returning to its rest position, as indicated by the arrows X in FIG. 1. Typically, the radial flexing of the containment material 4 will result in a circumferential "wave" of maximum initial amplitude Y (FIG. 1), feeding circumferentially around the containment material 4.

Breach of the casing mid-section 2*b* by the fan blade leaves a trepanned area in the casing 2, beneath the Kevlar® wrap, as indicated by the shaded area 8 in FIG. 1.

The trepanned area of the casing will tend to weaken the casing 2 between a first casing portion 10, comprising the intake section 2*a* and the front part of the midsection 2*b*, and a second casing portion 12, comprising the rear part of the mid section 2*b* and the rear section 2*c*, the latter being fixedly connected to the aircraft. In order to resist consequent separation of the relatively heavy front casing portion 10 from the second casing portion 12 (and consequent loss of the frontal intake section 2*a* of the engine) the fan assembly 1 is provided with a retaining cable arrangement 13.

The retaining cable arrangement 13 comprises a retaining cable 14 on the outside of the containment material. The ends of the cable 14 are mounted to first and second axially spaced anchorages 16, 18 on either side of the containment material 4, which are in turn fixedly bolted to the first casing portion 10 and the second casing portion 12 by bolts 20*a*, 20*b* (which in this case also extend through the attachment flanges on the respective casing sections 2*a*, 2*b* and 2*b*, 2*c*). The cable 14 is thus secured between the first casing portion 10 and the second casing portion 12.

The anchorage 16 fixedly secures the respective end of the cable 14 to the casing portion 10. At its opposite end, the cable 14 is slidably received through a guide hole 22 in the anchorage 18 and a biasing member, in this case a coil spring 24, acts between the anchorage 18 and a transmission plate 26 fixed to the respective end of the cable 14 to spring-load the cable under tension between the anchorages 16, 18.

The cable 14 is thus resiliently deflectable, upon initial application of a radial force inbetween the anchorages 16, 18, from the spring loaded position 28*a* shown in solid line in FIG. 1. In the deflected position 28*b* shown in phantom in FIG. 1, wherein the cable has been pulled through the anchorage 18, against the action of the coil spring 24, and the coil spring 24 will be consequently be relatively compressed as compared to the position shown in FIG. 1. In order to promote low-friction sliding of the cable 14 through the guide hole 22, the guide hole 22 is provided with a low-friction annular guide insert 22*a*.

The cable retaining arrangement further comprises a locking arrangement 30. The locking arrangement 30 is operable to allow initial radial deflection of the cable 14 but to lock the cable 14 between the anchorages 16, 18 following this initial radial deflection of the cable 14.

The locking arrangement 30 comprises a housing 32 fixedly attached to the anchorage 18. Although not visible in FIG. 1, the housing 32 comprises a clearance hole aligned with the guide hole 22 for receiving the cable 1 therethrough.

A locking element in the form of an inverted U-shaped catch 33 (FIG. 2) is slidably mounted on associated guides (not shown) in the housing 32. The catch 33, which is shown in isolation from the housing 32 in FIG. 2, has a spring-biased guillotine action, being biased for vertical movement down towards the cable 14 by an associated catch spring (the catch spring is not shown, but the biasing action of the catch spring is represented schematically in FIG. 2 by the arrows A). The catch 33 is configured for locking engagement with a stop element 36 on the cable 14 that defines an annular detent or recess 38 for receiving the curved inner edge of the catch 33 (see FIG. 3).

Figure 2:
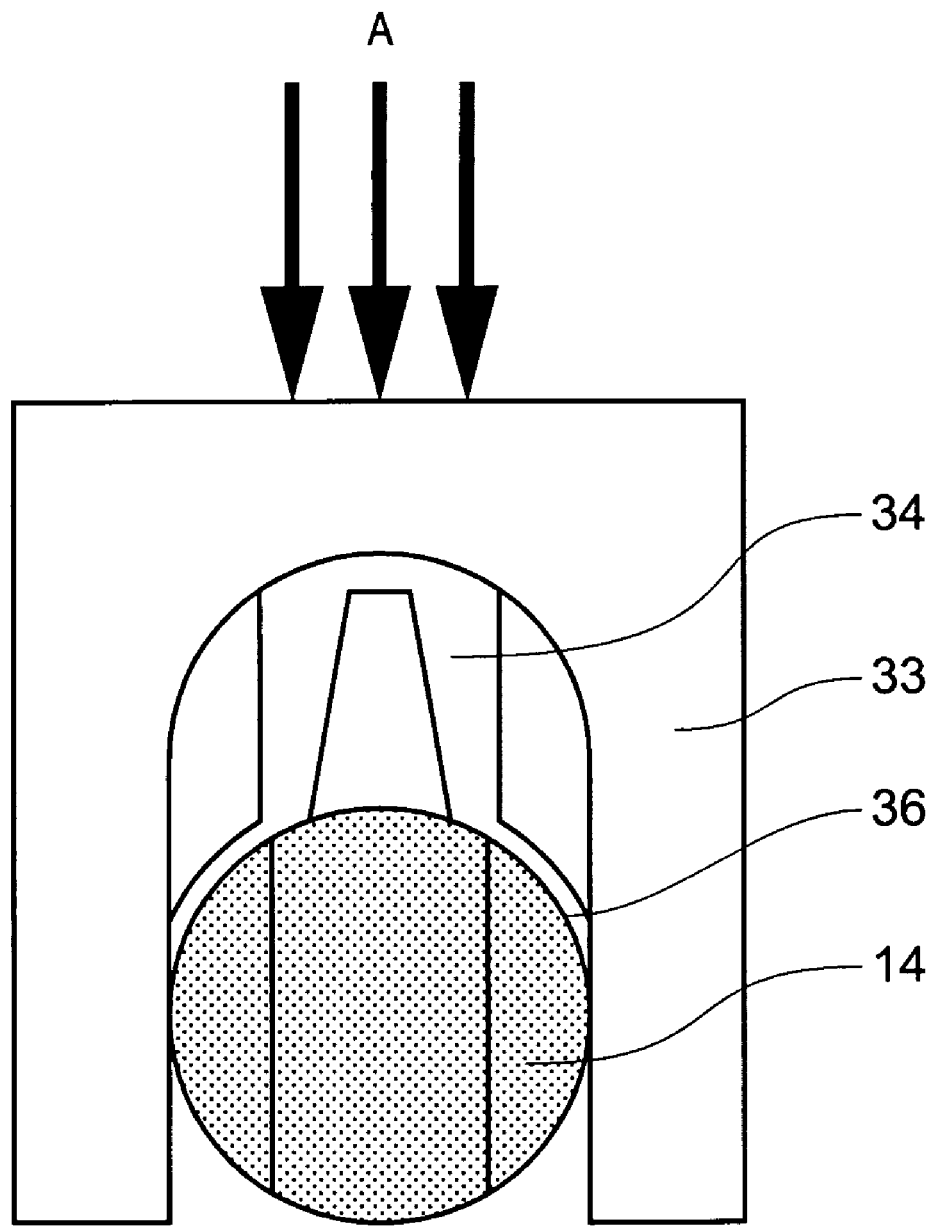
FIG. 2 is a schematic end-on view illustrating part of a cable retaining arrangement forming part of the fan assembly in FIG. 1.
Figure 3:
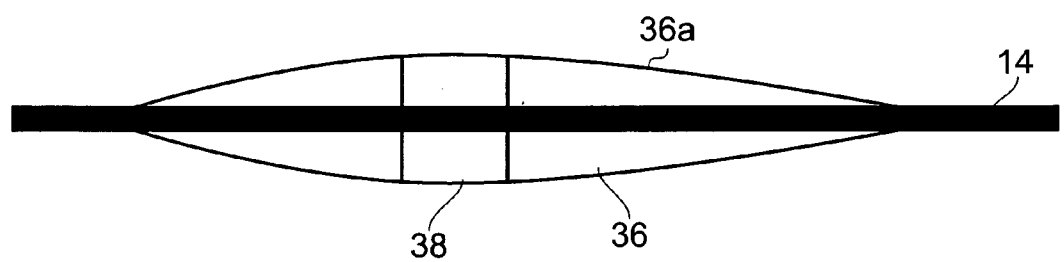
FIG. 3 is an enlarged schematic side view of part of the cable in the cable retaining arrangement shown in FIGS. 1 and 2.

Prior to any radial deflection of the cable 14 to the position 28*b* shown in FIG. 1, the catch 33 is maintained in a primed position (spaced above the detent 38 on the stop element 36) by a retaining element in the form of an interposing spacer tab 34, frangibly attached to either the cable 14 (as shown in FIG. 2) or, in an alternative embodiment, to the catch 33 (not shown).

The operation of the cable retaining arrangement is as follows:

Initially, prior to any breach of the casing 2, the cable 14 is in the spring-loaded position 28*a* represented in solid lines in FIG. 1. Here, the catch 33 is axially aligned with the annular detent 38 but is maintained in the aforementioned primed position, spaced upwardly from the detent 38, by the interposing frangible tab 34.

During an FBO event, a fan blade breaches the soft wall casing 2 and impacts the energy absorbing containment material 4. As the containment material 4 radially flexes to dissipate the impact energy of the fan blade, the containment material 4 exerts an outward radial force on the cable 14. In response, the cable 14 resiliently radially deflects, against the action of the coil spring 24, to accommodate radial flexing of the containment material (therefore reducing the tendency for the cable 14 to alter the containment characteristics of the containment material 4 and reducing the "snapping stress" exerted on the cable 14). As the cable 14 continues to deflect between the anchorages 16, 18, the stop element (or bullet) 36 is pulled through the housing 32, shearing off tab 34. Following detachment of the frangible tab 24, the cable is allowed to slide effectively unimpeded through the guide hole 22 in the anchorage 18 (but still against the action of the coil spring 24) towards the fully deflected position 28*b* shown in phantom in FIG. 1; at the same time, the catch is released from the primed position and urged downwardly towards the cable 14 by the catch spring. The locking arrangement 30 has now effectively been "triggered".

Following the initial impulse of the fan blade impact, the corresponding portion of the resilient containment material 4 flexes back towards its initial position (shown in FIG. 1) and the cable 14 is pulled back through the anchorage 18 and housing 32 under the action of the coil spring 24. During this time, the cable 14 slides past the catch 33 until the catch 33 is brought into axial alignment with the detent 38, at which point the catch 33 is urged down into locking engagement with the detent 38, effectively axially locking the cable 14 between the anchorages 16, 18 and preventing any further sliding movement of the cable 14 through the guide hole 22. In this position, axial separation of the front casing portion 10 and the rear casing portion 12 is resisted by tension in the locked cable 14, acting between the casing portions 10, 12.

In order to avoid the stop element 36 impeding alignment of catch 33 and detent 38, the stop element 36 is lozenge-shaped. Thus, the stop 36 defines a ramp surface 36*a* adjacent the detent 38 (see FIG. 3, which shows a side view of the stop element 36 and cable 14 in isolation). As the stop element 36 is pulled back through the housing 32 by the action of the spring 24, the ramp surface promotes axial sliding movement of the stop element past the catch 33, against the action of the catch spring (which is progressively compressed by the ramp surface 36*a*), until such time as the catch 33 is axially aligned with the detent 38. The stop element is thus effectively prevented from being jammed against the side of the catch 33 by the action of the spring 24 and a smooth locking action is promoted between the catch 33 and the stop 36.

For the purposes of clarity FIG. 1 shows only a single retaining cable 14 forming part of the cable arrangement 13. Whilst a single-cable arrangement is envisaged, the cable arrangement 13 might equally include a plurality of retaining cables similar to the retaining cable 14 and the locking arrangement 13 might include a suitable number of catches 33 or other suitable locking elements for locking the plurality of retaining cables following radial deflection of the cables.

Generally speaking the number, distribution and orientation of the retaining cables around the outside of the containment material can be varied according to the desired retaining characteristics for the cable arrangement. For example, the cable arrangement may comprise a plurality of such retaining cables running substantially parallel with the longitudinal axis of the casing and spaced at regular angular intervals around the circumference of the casing.

It is envisaged that because the cables are effectively "adaptive" retaining cables which have sufficient radial compliance to accommodate radial flexing of the containment material and which nevertheless subsequently lock following the initial radial deflection, a plurality of such cables can readily accommodate a circumferential wave travelling in the containment material beneath the cables without a critical number of the cables snapping and without undue compromise of the subsequent retaining function of the cables. In addition, because the cables are located on the outside of the containment material, it is envisaged that the cable retaining arrangement may conveniently be retro-fitted to existing fan casings.

Whilst in the embodiment described the cable 14 is spring-loaded by a single biasing member acting between the anchorage 18 and the cable 14, any number of biasing members may be employed, each acting between a respective anchorage and the cable. The biasing members need not be coil springs; any suitable biasing members may be used, in particular elastomeric elements. In any event, it is envisaged that the biasing members may be housed in an associated encasement for protection.

Alternative locking arrangements for locking the cable between the casing portions may also be envisaged. In particular, the locking arrangement need not be associated with an anchorage, but may be spaced apart from the anchorage, provided that the locking arrangement is suitable for locking the cable between the anchorages. For example, the locking housing 32 may be fixed directly to one of the casing sections 2a, 2b or 2c, rather than to the anchorage 18.

Although in the embodiment described the cable 14 is effectively of fixed length, and the effective separation of the anchorages 16, 18 is varied by moving the position of the transmission plate 26 relative to the fixed anchorage 18, it is envisaged that alternatively the effective separation of the anchorages might be fixed and the effective length of the respective cable between the anchorages might be varied to provide the necessary radial compliance of the cable between the anchorages. For example, one of the anchorages may incorporate a reel mechanism for spooling an additional length of the cable to accommodate the radial flexing of the containment material between the anchorages. In this arrangement, the additional length of cable may nevertheless be subsequently taken up by passive or active rewinding of the cable under the action of a spring bias or otherwise and the reel mechanism effectively locked by an associated locking arrangement for preventing subsequent spooling of the cable following the initial cable deflection.

The invention claimed is:

1. A fan assembly for a gas turbine, the assembly comprising:
   a fan surrounded by a fan casing;
   a resilient, radially flexible containment material wrapped around the outside of the fan casing for containing a fan blade which has breached the casing during a fan blade-off event, and
   a retaining cable arrangement for resisting separation of a first portion of the casing from a second portion of the casing as a result of said breach occurring between the first and second portion,
   wherein the cable arrangement comprises:
   a retaining cable on the outside of the containment material, secured between the first and second portion of the casing, the retaining cable being sufficiently radially compliant for radial deflection to accommodate radial flexing of the containment material caused by impact of said fan blade in between the first and second portion; and
   a locking arrangement operable to subsequently lock the retaining cable between the first and second portions of the casing whereby separation of the first and second portions is resisted by tension in the locked cable.

2. A fan assembly according to claim 1, wherein the cable is mounted to anchorages fixed relative to the first and second portions, the cable being spring-loaded between the anchorages for resilient radial deflection, against the action of the spring-load, to accommodate said radial flexing of the containment material.

3. A fan assembly according to claim 1, wherein the spring-loading is provided by one or more biasing members each acting between the cable and a respective one of the fixed anchorages.

4. A fan assembly according to claim 3, wherein the cable is fixed to one anchorage and said one or more biasing members act between the cable and the other of said anchorages.

5. A fan assembly according to claim 3, wherein the biasing member is a spring.

6. A fan assembly according to claim 3, wherein the biasing member is an elastomeric element.

7. A fan assembly according to claim 1, wherein the locking arrangement comprises one or more locking elements associated with the first or second casing portion, each locking element being biased for movement from a primed position into locking engagement with the cable, each locking element further being held in said primed position by a retaining element coupled to the cable for releasing the locking element in response to said radial deflection of the cable.

8. A fan assembly according to claim 7, wherein the locking element is a catch resiliently mounted to one of the anchorages, the retaining element is an interposing tab positioned between the catch and the cable for preventing engagement of the catch with the cable, and the tab is frangibly attached to one of the catch or cable for detachment therefrom upon said resilient radial deflection of the cable.

9. A fan assembly according to claim 8, wherein the cable is spring loaded between the anchorages for resilient radial deflection and further incorporates a stop element, the catch being radially biased for locking engagement with a detent on the stop element as the cable returns to said spring loaded position following said radial deflection, the catch being spaced away from the detent by the interposing frangible tab.

10. A fan assembly according to claim 9, wherein the stop element incorporates a ramp surface, adjacent the detent, for allowing progressive sliding longitudinal movement of the catch over the stop element, against said radial catch bias, until such time as the catch is radially aligned with the detent.

11. A fan assembly according to claim 1, wherein the fan assembly forms part of a gas turbine.

12. A fan assembly according to claim 1, wherein the fan assembly forms part of an aircraft engine.

* * * * *